United States Patent

[11] 3,555,307

[72] Inventor Minoru Hujita
Kodaira-Shi, Japan
[21] Appl. No. 764,428
[22] Filed Oct. 2, 1968
[45] Patented Jan. 12, 1971
[73] Assignee Hitachi, Ltd.
Chiyoda-ku, Tokyo, Japan
a corporation of Japan
[32] Priority Oct. 16, 1967
[33] Japan
[31] 42/66133

[54] FLIP-FLOP
5 Claims, 11 Drawing Figs.

[52] U.S. Cl. .......... 307/279, 307/225, 307/246, 307/304
[51] Int. Cl. .......... H03k 3/286
[50] Field of Search .......... 307/279, 205, 251, 291, 304, 246, 225

[56] References Cited

FOREIGN PATENTS 1,113,140 5/1968 Great Britain .......... 307/279

OTHER REFERENCES

IBM Technical Disclosure Bulletin, Vol. 9, No. 4, September 1966, pp 420 & 421, tilted " Memory Cell With Low Standby Power," written by G. C. Feth. A copy is located in class 307, subclass 279 in Art Unit 254.

*Primary Examiner*—Stanley T. Krawczewicz
*Attorney*—Craig, Antonelli, Stewart & Hill

ABSTRACT: A flip-flop, comprising a pair of inverter stages including N-channel MOS field effect transistors serving as switching elements, the pair of inverter stages being cross coupled to each other so as to assume two stable switching states, steering gate circuits adapted to sense the switching states of each of the inverter stages, and switching circuits for changing one switching state sensed by the gate circuits to the other switching state, wherein each of the steering gate circuits is constituted by a P-channel MOS field effect transistor connected with the output terminal of one of the inverter stages and an N-channel MOS FET connected in series with the P-channel FET, the input terminal is connected with the P-channel FET's, and the output terminal of the other inverter stage is connected with the N-channel FET's.

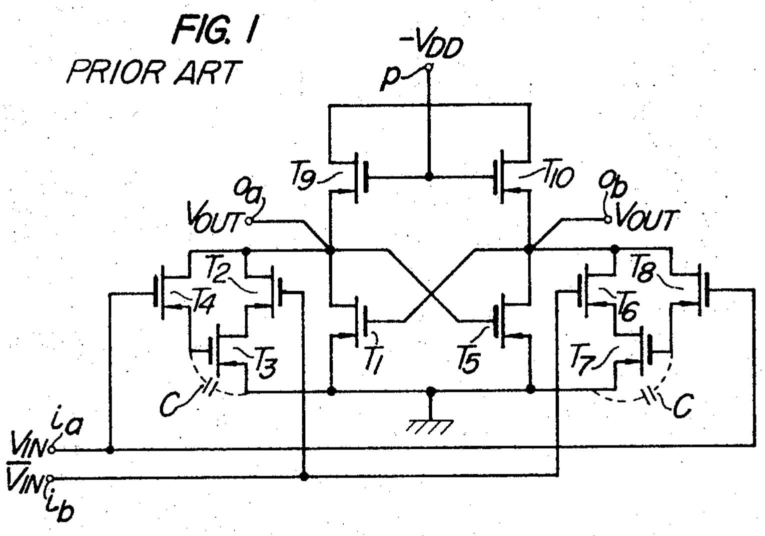
FIG. 1 PRIOR ART
FIG. 2a $\overline{V_{IN}}$
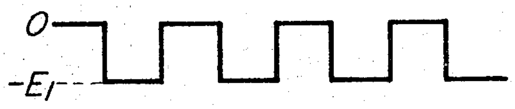
FIG. 2b $V_{IN}$
FIG. 2c $V_{OUT}$
FIG. 2d $\overline{V_{OUT}}$
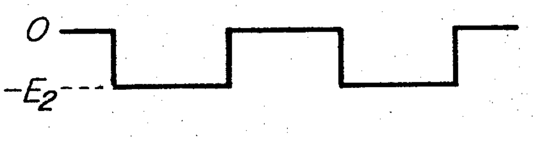
FIG. 3
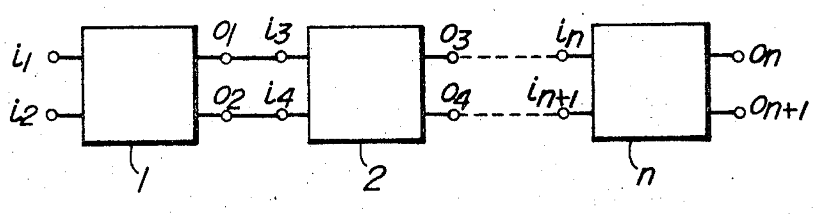

FLIP-FLOP

This invention relates to a flip-flop using insulated gate-type field effect transistors.

It is well known in the art to construct a flip-flop for performing binary-counting action by the use of insulated gate-type or MIS-(Metal Insulator Semiconductor) type field effect transistors (referred to simply as MIS transistor hereinafter). In such flip-flop, the gate capacitance of an MIS transistor is utilized as element for temporarily storing information. Thus, the flip-flop of the aforementioned type is advantageous over a binary counter flip-flop using bipolar transistors in that the number of circuit elements can be greatly reduced and power consumption can be lowered, and it is advantageous particularly in that the manufacture thereof can be facilitated when it is constructed in the form of a semiconductor integrated circuit, since it is constituted by MIS transistors.

Such flip-flop is disclosed in the U.S. Pat. No. 3,363,115, for example. Another example will be described with reference to the drawings.

Considering the breakdown voltage of an MIS transistor, variation of power source voltage $V_{DD}$ and power consumption in the semiconductor integrated circuit arrangement, it is desirable that such flip-flop be operated at a low voltage. That is, if the flip-flop can be operated by means of a low-voltage source, then variation of the DC power source voltage $V_{DD}$ becomes noncritical, since the upper limit of the power source voltage for the flip-flop is determined by the breakdown voltage of the MIS transistor. Thus, the power source $V_{DD}$ can be constituted by dry cells, and no stabilized power source device is needed.

Because of low-power source voltage, the "on" current flowing through MIS transistor is decreased, which leads to less power consumption in the flip-flop per se. This is advantageous in that heat generation in the semiconductor integrated circuit arrangement can be minimized. Particularly in an attempt to construct a counter comprising a number of such flip-flops in a single semiconductor substrate by the integrated circuit technique, it is essential that power consumption be minimized to prevent heat generation.

In the conventional flip-flop, on the other hand, an input pulse signal voltage $V_{IN}$ for driving steering gate MIS transistors should be high, and therefore the power source voltage $V_{DD}$ should also be high.

It is an object of the present invention to provide a flip-flop which can be operated by a low-voltage source and is constituted by MIS transistors.

Another object of the present invention is to provide a flip-flop suited to construct a counter (flip-flop chain) which is capable of achieving the desired counting action.

Still another object of the present invention is to provide a flip-flop which can easily be produced by the semiconductor integrated circuit technique.

In accordance with an embodiment of the present invention, there is provided a flip-flop comprising first and second switching stages or inverter stages which are cross coupled to each other, said first and second switching stages or inverter stages being constituted by first and second MIS or MOS (Metal-Oxide-Semiconductor) transistors in such a manner as to assume two stable switching states, first and second steering gate circuits connected with the first and second switching stages to sense the switching states of the latter respectively, and first and second switching circuits connected between the gate circuits and the first and second switching stages to change the switching state of the switching stages from one stable state sensed by the gate circuits to the other stable state. The two steering gate circuits are constituted by third and fourth MIS transistors connected with the output terminals of the first and second switching stages respectively, and fifth and sixth MIS transistors connected in series with the third and fourth transistors respectively. The third and fourth MIS transistors are connected with first and second input terminals respectively, and the fifth and sixth MIS transistors are connected with the output terminals of the second and first switching stages respectively. The switching circuits are constituted by MIS transistors which receive as input thereto the output of the steering gate circuits to temporarily memorize the state of the flip-flop. The third MIS transistor and the fifth MIS transistor are complementary to each other, i.e., opposite to each other in respect of channel-conductivity-type, as is the case with the fourth and sixth transistors. In short, the novel feature of the flip-flop embodying the present invention resides in that two complementary MIS transistors are connected in series with the circuits between the sources and the drains of inverter transistors, and that the outputs of the gate circuits are imparted to the memory MIS transistors as inputs.

Thus, the input pulse signal may be of single phase, and the input pulse signal voltage may be low. In addition, such circuit arrangement can easily be constructed in the form of a semiconductor integrated circuit, since it is constituted by MIS or MOS transistors.

Other objects, features and advantages of the present invention will become apparent from the following description taken in conjunction with the accompanying drawings, in which:

FIG. 1 is a circuit diagram showing a conventional flip-flop;

FIGS. 2*a* to 2*d* are views showing waveforms useful for explaining the operation of the flip-flop shown in FIG. 1;

FIG. 3 is a block diagram showing a flip-flop chain wherein a plurality of flip-flops are connected in cascade with each other;

Figure 4:
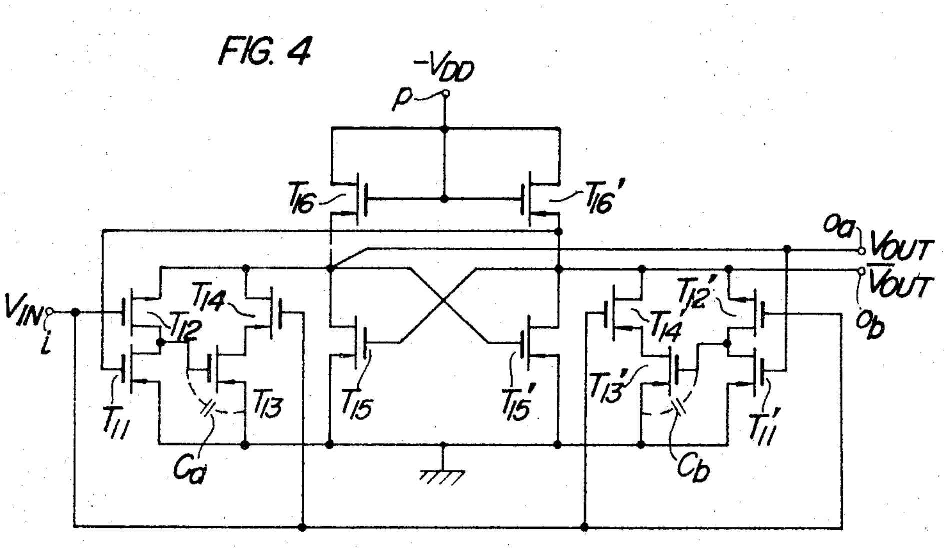
FIG. 4 is a circuit diagram showing the flip-flop according to an embodiment of the present invention.
Figures 5A, 5B:
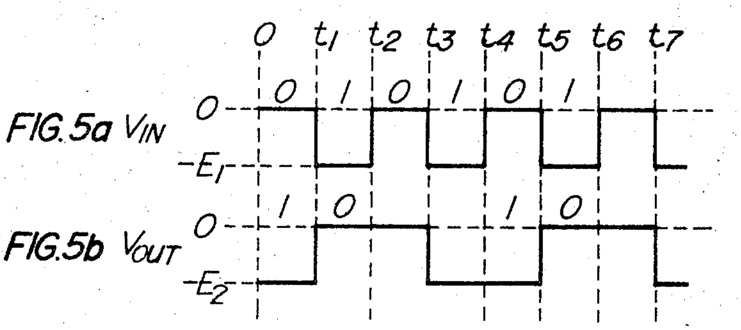
Figure 6:
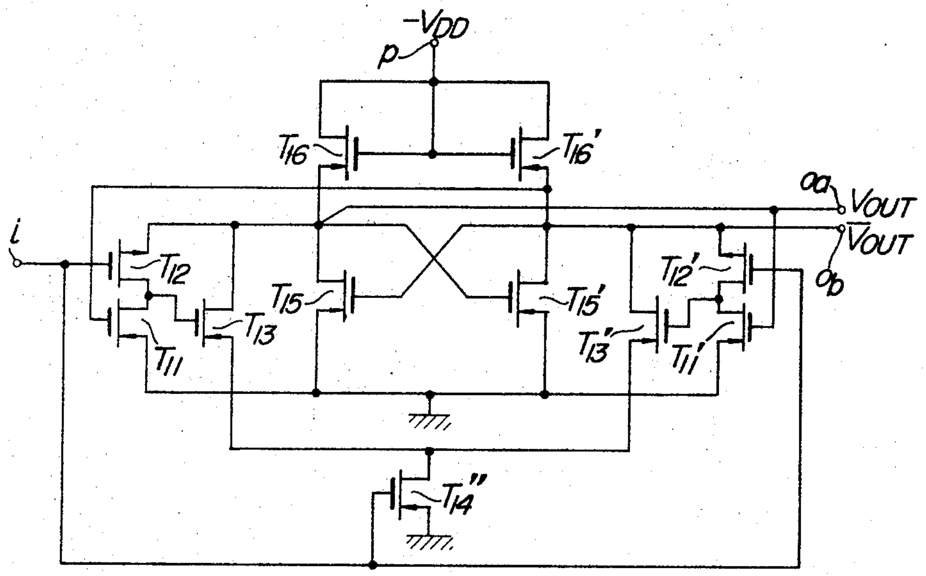
Figure 7:
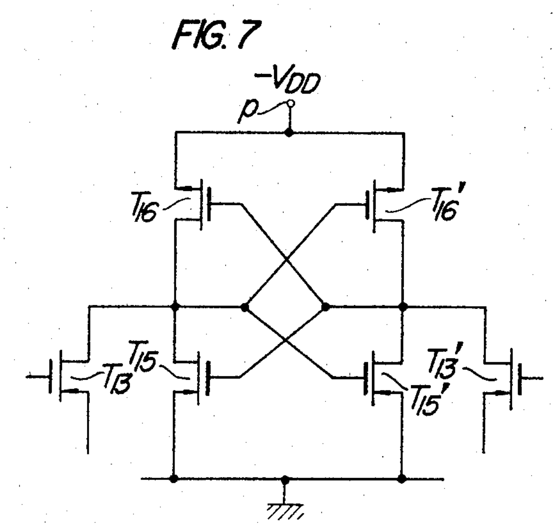

FIGS. 5*a* and 5*b* are views showing waveforms useful for explaining the operation of the flip-flop shown in FIG. 4;

FIG. 6 is a flip-flop according to a second embodiment of the present invention; and FIG. 7 is a circuit diagram showing part of the flip-flop according to a third embodiment of the present invention.

Referring first to FIG. 1, $T_1$ and $T_5$ represent inverter MIS transistors, and $T_9$ and $T_{10}$ load MIS transistors of which the drain electrodes are connected with a DC power source terminal P. $T_2$ and $T_6$ denote control MIS transistors of which the gate electrodes are connected with an input pulse signal terminal $i_b$. $T_3$ and $T_7$ indicate storage MIS transistors adapted for producing storing effect in accordance with the gate capacitance thereof, and $T_4$ and $T_8$ steering gate MIS transistors of which the gate electrodes are coupled to an input pulse signal terminal $i_a$.

By applying pulse signals 180° out of phase with each other such as shown in FIGS. 2*a* and 2*b* to the pulse signal input terminals $i_a$ and $i_b$ respectively, it is possible to obtain at output terminals $0_a$ and $0_b$ output pulse signals of which the frequency is half the input pulse signal frequency as shown in FIGS. 2*a* and 2*b*, respectively. Thus, this flip-flop is enabled to produce binary-counting action.

The insulated gate MIS transistors $T_4$ and $T_8$ have their source electrodes connected with the gate electrodes of the storage MIS transistors $T_3$ and $T_7$. Hence, when the gate capacitances of the storage MIS transistors $T_3$ and $T_7$ are negatively charged, the gate voltage (referred to as threshold voltage) to render the gate MIS transistors $T_4$ and $T_8$ conductive remains unchanged with respect to the source voltage, but the gate voltage to turn on the transistors $T_4$ and $T_8$ relative to the earth potential becomes negatively higher (−15 v., for example) than the threshold voltage (−6 v., for example) of the transistor $T_3$. Thus, it is necessary to use a high negative voltage (−20 v., for example) as input pulse signal voltage $v_{IN}$.

On the other hand, the gate voltage (voltage between the gate and the source) of the control MIS transistors $T_2$ and $T_6$ is available from the input pulse signal voltage source $\overline{V_{IN}}$ through the paths between the sources and drains of the memory MIS transistors $T_3$ and $T_7$. The control MIS transistors $T_2$ and $T_6$ are rendered conductive only when the memory MIS transistors $T_3$ and $T_7$ are turned "on," so that the voltage of the voltage source $\overline{V_{IN}}$ may be lower than that of the voltage source $V_{IN}$ (half the voltage of the voltage source $V_{IN}$, for example).

As described above, in the conventional flip-flop circuit, the input pulse signal voltage $\overline{V}_{IN}$ may be low, but the input pulse signal voltage $V_{IN}$ should be high.

In an attempt to construct $2^n$ -counter by connecting $n$ such flip-flops in cascade with each other as shown in FIG. 3, it is necessary to use a high-power source voltage $-V_{DD}$ (−30 v., for example), since the pulse signal voltage $V_{IN}$ applied to the input pulse signal terminal $i$ of a succeeding flip-flop should be high (the output pulse voltage $V_{OUT}$ at the output terminal 0 of the flip-flop should be high).

Description will now be made of an embodiment of the present invention with reference to FIG. 4.

Referring to FIG. 4, $T_{15}$ and $T'_{15}$ represent inverter MIS transistors, and $T_{16}$ and $T'_{16}$ load MIS transistors of which the drain electrodes as well as the gate electrodes are connected with the power source terminal P. $T_{14}$ and $T'_{14}$ indicate control MIS transistors of which the gate electrodes are connected with the input pulse signal terminal $i$. $T_{13}$ and $T'_{13}$ denote memory MIS transistors for producing a memory effect with the aid of their gate capacitances $C_a$ and $C_b$. A pair of switching circuits are constituted by the transistors $T_{13}$, $T_{14}$ and $T'_{13}$, $T'_{14}$, respectively. $T_{11}$ and $T'_{11}$ represent first and second steering gate MIS transistors of which the gate electrodes are connected with the drain electrodes of the inverter MIS transistors $T'_{15}$ and $T_{15}$ respectively. As the inverter MIS transistors, control MIS transistors, memory MIS transistors and first and second steering gate MIS transistors, use is made of P-channel enhancement MOS FET's. Further, as $T_{12}$ and $T'_{12}$, use is made of N-channel enhancement MOS FET's whose channel is of the opposite conductivity type to that of the gate MIS transistors $T_{11}$ and $T'_{11}$, namely, N-channel. The P-channel and N-channel MOS FET's may be formed in a silicon substrate by the conventional selective diffusion technique. Each of the pair of switching circuits is adapted to memorize and control the flip-flop conditions through the first and second steering gate transistors, respectively. $T_{12}$ and $T'_{12}$ represent third and fourth steering gate MIS transistors having the gates thereof connected with the pulse signal input terminal $i$.

The DC voltage $-V_{DD}$ is applied to the power source terminal P, and such a pulse signal as shown in FIG. 5$a$ is imparted to the pulse signal input terminal $i$.

Thus, it is possible to obtain at the terminal $0_a$ (or $0_b$) an output pulse signal $V_{OUT}$ (or $\overline{V}_{OUT}$) of which the frequency is half the frequency of the input pulse signal as shown in FIG. 5$b$.

In order to give better understanding of the present invention, the circuit operation will be described with reference to FIG. 5.

Assume that the input pulse signal voltage $V_{IN}$ is a reference potential (0-level) during the period of time from 0 to $t_1$ to render $T_{15}$ nonconductive ($T'_{15}$ conductive) so that $V_{OUT}$ becomes approximately $-E_2$ volts (1-level). Then, since $T'_{15}$ is in the conducting state, $\overline{V}_{OUT}$ becomes approximately equal to the reference voltage, and $T_{11}$ is rendered nonconductive. On the other hand, $T'_{11}$ is in the conducting state. At this point, $T_{12}$ and $T'_{12}$ are rendered conductive and $T_{14}$ and $T'_{14}$ nonconductive by the input pulse signal voltage $V_{IN}$, so that the gate capacitance $C_a$ of $T_{13}$ is charged up to the voltage of $-E_2$ volts through the passage between the source and the gate of $T_{12}$. Thus, $T_{13}$ is rendered conductive, while $T'_{13}$ remains nonconductive since the gate voltage thereof becomes zero.

Next, consider the range from $t_1$ to $t_2$ where the input pulse signal voltage is $-E_1$ volts. In the transient state occurring at and around the point of time $t_1$, $T_{12}$ and $T'_{12}$ are rendered nonconductive momentarily when the point of time $t_1$ is reached, but $T_{13}$ remains in the previous state or conducting state due to the voltage stored in the gate capacitance thereof. On the other hand, $T'_{13}$ is maintained in the nonconducting state. $T_{14}$ and $T'_{14}$ are momentarily rendered conductive at the point of time $t_1$. Thus, in the transient state, the drain voltage of $T_{15}$ (hence the gate voltage of $T'_{15}$) becomes substantially zero so that $T'_{15}$ is rendered nonconductive while $T_{15}$ is rendered conductive. This is reversal of the state occurring between the points of time 0 and $t_1$. In the steady state subsequent to the reversal of state, $T_{11}$ is rendered conductive so that $T_{13}$ is made nonconductive. Further, since $T_{15}$ is in the conductive state, $T'_{11}$ is rendered nonconductive, and $T'_{13}$ is still maintained in the nonconducting state.

In this way, the inverter MIS transistors are supplied with the input pulse signals, and when both the memory MIS transistors and the control MIS transistors are rendered conductive, the state of the flip-flop is reversed. Thus, the flip-flop is returned to the original state at every second input pulse signal.

Tables 1 and 2 show changes of the state of each transistor with time, from which the operation of this invention will be more readily appreciated. In these tables, the state indicated in the upper frame at each point of time indicates a transient state which occurs momentarily upon change of the input pulse signal, and the state indicated in the lower frame shows a steady state occurring at that point of time. For example, in the column corresponding to the period between the points of time $t_1$ and $t_2$, "on" is indicated in the upper frame and "off" in the lower frame for $T_{13}$. This means that in the transient state occurring at the point of time $t_1$, $T_{13}$ is in the conducting state, and it is rendered nonconductive in the steady state wherein the inverter transistors are reversed, as described above.

TABLE 1

| Time | $V_{IN}$ | $V_{OUT}$ | $T_{11}$ | $T_{12}$ | $T_{13}$ | $T_{14}$ | $T_{15}$ |
|---|---|---|---|---|---|---|---|
| $0\sim t_1$ | 0 | | | | | | |
| | | $-E_2$ | off | on | on | off | off. |
| $t_1\sim t_2$ | $-E_1$ | | off | off | on | on | |
| | | 0 | on | off | off | on | on. |
| $t_2\sim t_3$ | 0 | | on | on | off | off | |
| | | 0 | on | on | off | off | on. |
| $t_3\sim t_4$ | $-E_1$ | | on | off | off | on | |
| | | $-E_2$ | off | off | off | on | off. |
| $t_4\sim t_5$ | 0 | | off | on | on | off | |
| | | $-E_2$ | off | on | on | off | off. |
| $t_5\sim t_6$ | $-E_1$ | | off | off | no | on | |
| | | 0 | on | off | off | on | on. |

TABLE 2

| Time | $V_{IN}$ | $V_{OUT}$ | $T'_{11}$ | $T'_{12}$ | $T'_{13}$ | $T'_{14}$ | $T'_{15}$ |
|---|---|---|---|---|---|---|---|
| $0\sim t_1$ | 0 | | | | | | |
| | | | on | off | on | on | off. |
| $t_1\sim t_2$ | $-E_1$ | | on | off | off | on | |
| | | $-E_2$ | off | off | off | on | off. |
| $t_2\sim t_3$ | 0 | | on | on | on | off | |
| | | $-E_2$ | off | on | on | off | on. |
| $t_3\sim t_4$ | $-E_1$ | | off | off | on | on | |
| | | 0 | on | off | off | on | on. |
| $t_4\sim t_5$ | 0 | | on | on | off | off | |
| | | 0 | on | on | off | off | on. |
| $t_5\sim t_6$ | $-E_1$ | | on | off | off | on | |
| | | $-E_2$ | off | off | off | on | off. |

As will be seen from tables 1 and 2, it is when the memory MIS transistor $T_{13}$ (or $T'_{13}$) and control MIS transistor $T_{14}$ (or $T'_{14}$) are simultaneously rendered conductive that the state of the flip-flop is reversed.

Thus, the gate voltage to render the control MIS transistors conductive can be maintained at a low value (−6 v., for example) with respect to the earth potential without being affected by the memory MIS transistors, so that the maximum value $-E_1$ volts of the input pulse signal $V_{IN}$ can be made close to the threshold voltage of the control MIS transistor (−7 v., for example).

The MIS transistor $T_{12}$ (or $T'_{12}$) is adapted to turn on only when the input pulse signal $V_{IN}$ is zero volt (reference potential) so that the inverter MIS transistor $T_{15}$ (or $T'_{15}$) is rendered nonconductive. Thus, the threshold voltage of $T_{12}$ (or $T'_{12}$) is available directly from the drain voltage of the inverter transistor $T_{15}$ (or $T'_{15}$). Consequently, the gate voltage relative to the earth potential to render $T_{12}$ or $T'_{12}$ conductive is made substantially equal to the threshold voltage of $T_{12}$ (or $T'_{12}$) without being influenced by the other transistors, as in the conventional case.

The result is that the power source voltage $-V_{DD}$ determining the drain voltage of the inverter MIS transistor when the latter is in the nonconductive state can be made low (−14 v., for example).

Thus, in accordance with the present invention, the 1-level voltages $-E_1$ and $-E_2$ for the input pulse signal voltage $V_{IN}$ and output pulse signal voltage $V_{OUT}$ can be made equal, and yet they can be made low. This makes it possible to realize a cascaded connection of multiple flip-flops (flip-flop chain) without increasing the power source voltage as in the prior art.

Furthermore, in accordance with the present invention, a binary-counting action can be produced merely by the use of a single-phase input pulse signal voltage, and therefore a flip-flop chain such as shown in FIG. 3 can be realized by connecting the output terminal directly with the pulse signal input terminal of a succeeding flip-flop.

FIG. 6 shows another embodiment of the present invention, wherein parts representing the same functions as those of FIG. 4 are represented by similar symbols.

This flip-flop is different from the FIG. 4 arrangement in that the path between the source and the drain of the control MIS transistor $T''_{14}$ is connected in series with the paths between the sources and drains of the memory MIS transistors $T_{13}$ and $T'_{13}$. With such a circuit arrangement, it is possible to perform the same operation as that of the FIG. 4 circuit arrangement described above.

In the foregoing flip-flops of the present invention, N-channel enhancement mode MIS FET's were used as the gate transistors ($T_{12}$ and $T'_{12}$), and P-channel enhancement mode MIS FET's as the remaining transistors. However, this invention is not limited to such cases, but it can equally be applied to the cases where use is made of P-channel MIS FET's as the gate transistors and N-channel MIS FET's as the remaining transistors. In the latter cases, pulse signals to be handled are naturally limited to those which change in the positive direction with respect to the reference voltage. Although description has been made of the case where the load MIS transistors were indentical in channel conductivity type with the inverter MIS transistors, it is possible that resistance elements are constituted by transistors of opposite conductivity type to that of the inverter MIS transistors. In this case, the load MIS transistors $T_{16}$ and $T'_{16}$ are connected, for example, as shown in FIG. 7.

I claim:

1. A flip-flop, comprising first and second switching stages including:

first and second insulated gate field effect transistors serving as switching elements, the inputs and outputs of said two switching stages being cross coupled to each other so that said two switching stages constitute a bistable switching circuit;

first and second steering gate circuits connected with said first and second switching stages, respectively, to sense the switching states of said switching stages, said first gate circuit being constituted by a third insulated gate field effect transistor having a channel of a first conductivity type and a fourth insulated gate field effect transistor having a channel of a second conductivity type which is connected in series with said third transistor, said second gate circuit being formed by a fifth insulated gate field effect transistor having a channel of the first conductivity type and a sixth insulated gate field effect transistor having a channel of the second conductivity type which is connected in series with said fifth transistor;

first and second switching circuit means for changing said switching states of said switching stages from one stable switching state sensed by the steering gate circuits to the other stable switching state, said first switching means being connected with said first switching stage and said first steering gate circuit, said second switching means being connected with said second switching stage and said second steering gate circuit;

input terminals connected with said third and fifth insulated gate field effect transistors and said first and second switching circuits;

means for connecting the output of the first switching stage to the gate of said sixth transistor; and means for connecting the output of the second switching means to the gate of said fourth transistor.

2. A flip-flop as set forth in claim 1, wherein said third and fifth insulated gate field effect transistors are of N-channel enhancement mode, and said fourth and sixth insulated gate field effect transistors are of P-channel enhancement mode.

3. A flip-flop, comprising a first insulated gate-type field effect transistor of a first conductivity type having the drain thereof connected with a DC power source through a first resistance element and the source thereof connected with a reference potential source; a second insulated gate type of the first conductivity type having the drain thereof connected with the gate of said first field effect transistor and with the DC power source through a second resistance element, the gate and source of said second field effect transistor being connected with the drain of said first field effect transistor and said reference potential source respectively; a third insulated gate-type field effect transistor of second conductivity type having the source thereof connected with the drain of said first field effect transistor and the gate thereof connected with a pulse input terminal; a fourth insulated gate field effect transistor of the second conductivity type having the source thereof connected with the drain of said second field effect transistor and the gate thereof connected with said pulse input terminal; a fifth insulated gate field effect transistor of the first conductivity type having the drain thereof connected with the drain of said third field effect transistor and the gate thereof connected with the drain of said second field effect transistor and the source thereof connected with the reference potential source; a sixth field effect transistor of the first conductivity type the drain, source and gate of which are connected with the drain of said fourth field effect transistor, said reference potential source and the drain of said first field effect transistor respectively; a seventh insulated gate field effect transitor having the passage between the source and the drain thereof connected in parallel with the passage between the source and the drain of said first field effect transistor through the passage between the source and the drain of a control insulated gate field effect transistor of the first conductivity type, the gate of said seventh transistor being connected with the drain of said fifth field effect transistor; and an eighth insulated gate field effect transistor having the passage between the source and the drain thereof connected in parallel with the passage between the source and the drain of said second field effect transistor through the passage between the source and the drain of said control insulated gate field effect transistor being connected with the drain of said sixth field effect transistor, the gate of said control field effect transistor being connected with said pulse input terminal.

4. A flip-flop as set forth in claim 3, wherein first and second insulated gate field effect transistors of the first conductivity type are used instead of said control transistor, the passage between the source and the drain of said first control field effect transistor is connected in series with that of said seventh transistor, the passage between the source and the drain of said second control field effect transistor is connected in series with that of said eighth transistor, and the gates of said first and second control transistors are connected with said pulse input terminal.

5. A flip-flop as set forth in claim 3, wherein insulated gate field effect transistors are utilized as said first and second resistance elements.